R. L. SAVAGE.
LINK FOR TRACTOR TRACKS.
APPLICATION FILED OCT. 16, 1919.

1,417,693.

Patented May 30, 1922.
3 SHEETS—SHEET 1.

INVENTOR
R.L. SAVAGE
BY
ATT'Y

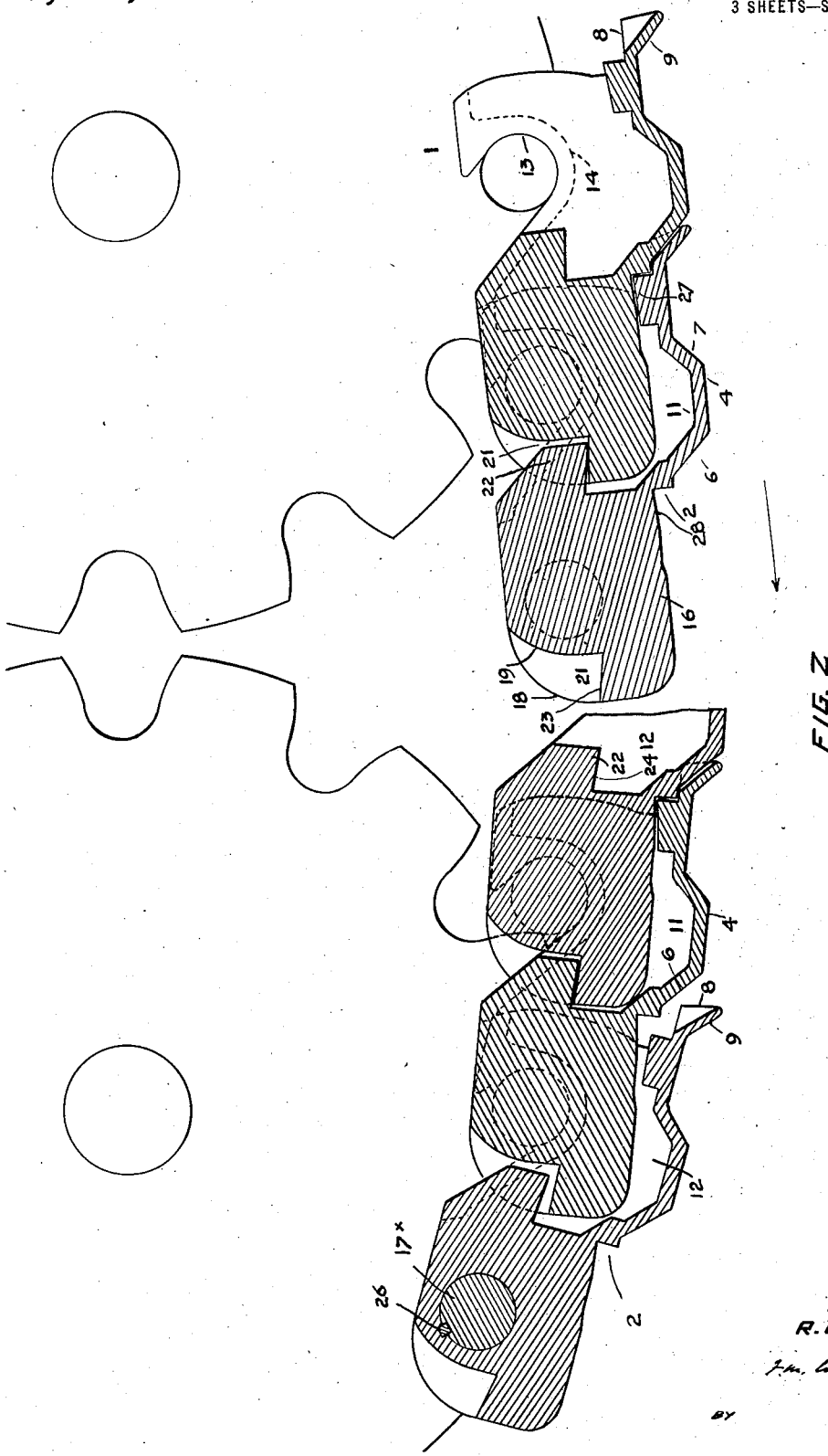

R. L. SAVAGE.
LINK FOR TRACTOR TRACKS.
APPLICATION FILED OCT. 16, 1919.

1,417,693.

Patented May 30, 1922.
3 SHEETS—SHEET 3.

INVENTOR
R. L. SAVAGE

BY

ATT'Y.

UNITED STATES PATENT OFFICE.

ROBERT L. SAVAGE, OF SAN FRANCISCO, CALIFORNIA.

LINK FOR TRACTOR TRACKS.

1,417,693.  Specification of Letters Patent.  Patented May 30, 1922.

Application filed October 16, 1919. Serial No. 331,112.

*To all whom it may concern:*

Be it known that I, ROBERT LOUIS SAVAGE, a citizen of the United States, residing at San Francisco, in the county of San Francisco and State of California, have invented new and useful Improvements in Links for Tractor Tracks, of which the following is a specification.

The object of the present invention is to provide an improved link for a track of a tractor or the like, such that said links will automatically interlock with each other to sustain the weight of the tractor or other vehicle between the sprocket wheels without any supporting means for the vehicle supported upon the track between the wheels. A further object of the invention is to provide such a link for a track that the links so interlocked will form a camber or slight convexity between the wheels, rigidly sustained against upward movement of said links.

Figure 1:
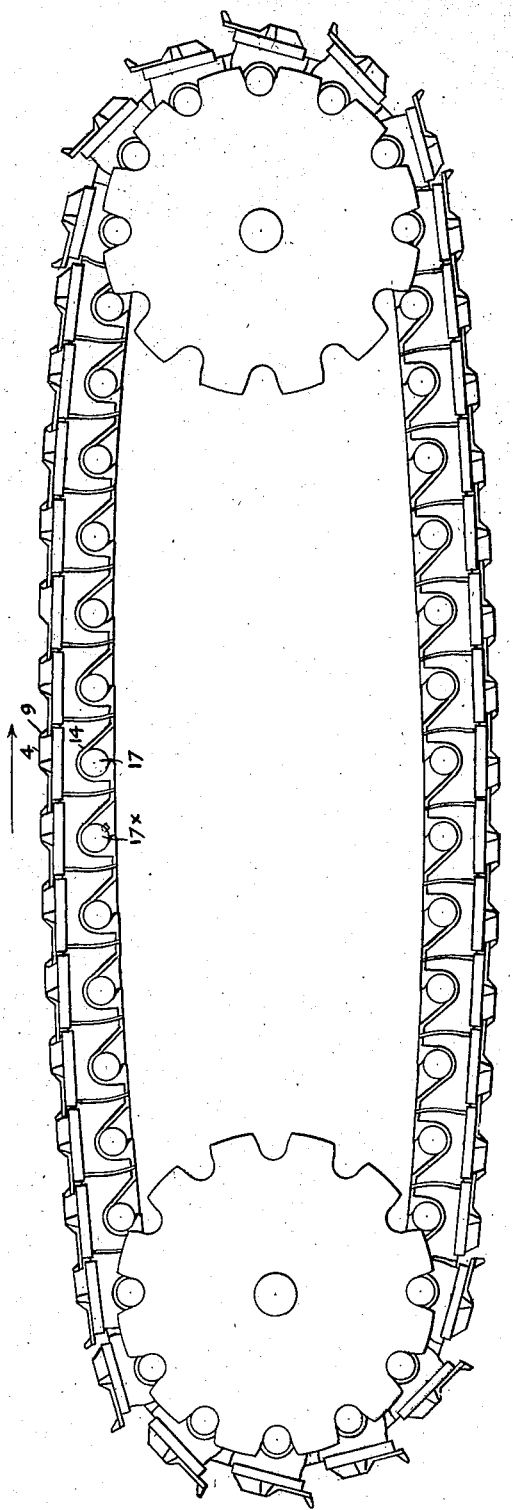
Figure 5:
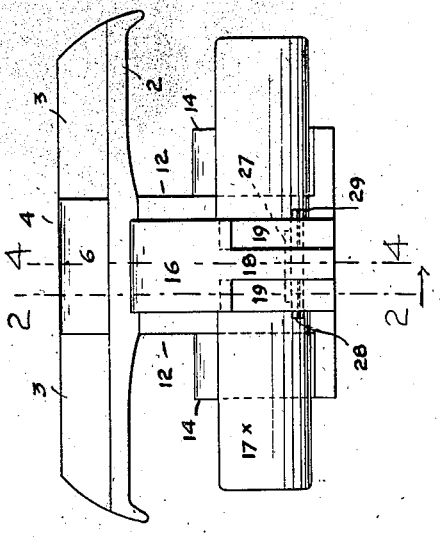
Figure 6:
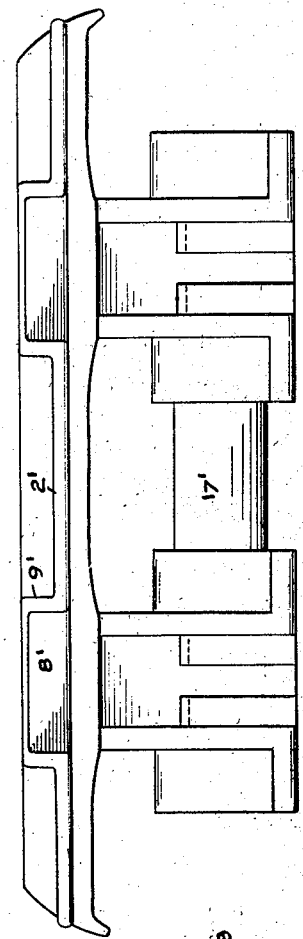
Figure 3:
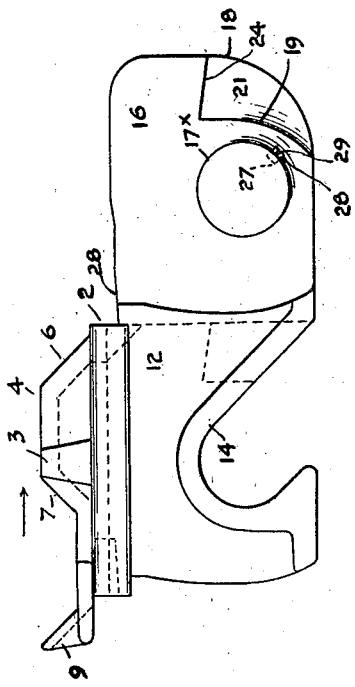
Figure 4:
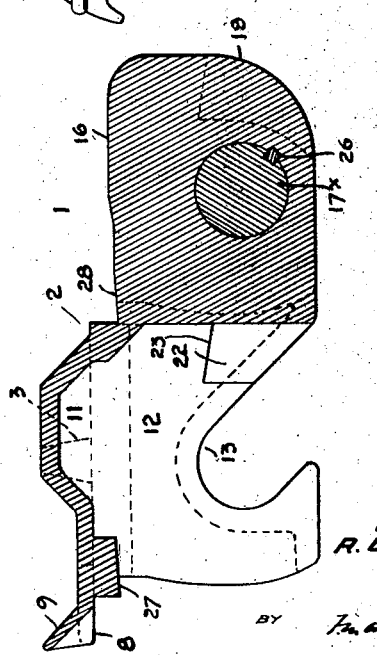

In the accompanying drawing, Figure 1 is a side view of the track and sprocket wheels around which it travels; Figure 2 is a broken longitudinal section showing the sprocket wheels in side elevation and the links in section on the line 2—2 of Figure 5; Figure 3 is a side view of a link; Figure 4 is a longitudinal sectional view of the link on the line 4—4 of Figure 5; Figure 5 is a front view of the link; Figure 6 is an end view of a modification thereof.

Referring to the drawing, 1 indicates my improved link. It is provided with a tread portion 2 of any width desired, which is here shown as provided with laterally extending ribs 3, to obtain sufficient traction on soft ground, the center of the tread being provided between said ribs 3 with a longitudinal deep extension 4 formed with beveled front and rear ends, 6, 7. Said tread is also provided on its outer surface at its rear end with a lip 8 adapted to overlap the front end of the tread of the preceding link, and on the center of said lip is provided with an additional short beveled lip 9 adapted to overlap the front beveled end 6 of the extension 4. However, the form of the tread portion of the link is for the most part immaterial to my invention.

Said inward extension 4 is hollowed out on its inner side, as shown at 11, and on each side of the hollowed out portion of said extension are secured to said tread a pair of walls 12 formed at their inner edges with pin bearings 13, said bearings being reinforced by lateral extensions 14 from said walls, said extensions on their inner sides being of the same form as said bearings. Said walls 12 are extended forwardly, and between the front ends of said walls is secured the rear end of a wall 16, which extends between the walls 12 of the next succeeding link, and carries a transverse pin 17 extending on each side of said wall 16 and adapted to engage the bearings 13 of the next succeeding link. The bearings 13 of each link open inwardly to receive said pin of the adjacent forward link and are directed towards said opening slightly forwardly.

The central portion 18 of the wall 16 extends further to the front than the remaining side portions 19 of the wall 16, both at its front and rear ends, so as to leave a recess 21 in the wall 16 at its front end in which to receive an extension 22 from the wall 16 at its rear end. Shoulders 23 are formed on said remaining portions 19 of the wall 16 at its rear end, which abut against shoulders 24 formed in the wall 16 at its front end, and the engagement of the shoulders 23 with the shoulders 24 prevents the tread buckling upwards between two links under the weight of the tractor.

It is evident that the lifting of the rear portion of the first tread can only be effected with the accompaniment of the lifting of the rear portion of the second tread, and this can only be effected with the accompaniment of the lifting of the rear portion of the third tread and so on throughout the entire track until the rear sprocket wheel is reached, which prevents any lifting of the rear portion of the first link which is in engagement with said sprocket wheel, so that the whole tread is held rigidly in place against any buckling of any intermediate portion. In the same way, the upper track is held rigidly against downward buckling between the two sprocket wheels.

Moreover, I make both of said shoulders 23, 24, at the front and at the rear of the wall 16 of the link slope upwardly from the front to the rear end. The reason for this construction is to allow of the wearing of the pins 17 and the bearings 13, for if the pins and bearings become so worn that the chain of links is extended, then the shoulders 23 slide upon the shoulders 24 and as they slide, because of their outward slope, they press the outer side of the links outwardly.

The transverse pins 17 are fixedly secured in all of the links except one, in which the pin 17ˣ is removable for the purpose of assembling the links. It is provided with a key 26, having a portion 27 fitted in the pin 17ˣ and a portion 28 of greater length to engage the link, having split ends 29 which extend outside the link and which can be spread, after the fashion of a cotter-pin, to retain the key in place.

In the modification of the invention shown in Figure 6 two links are placed side by side having a single tread 2', a pin 17' extending into both links. This enables the chain to be driven by a sprocket wheel engaging the links in the center, whereas, in the form of the invention first described, a double sprocket wheel must be used at each end of the chain, engaging the ends of the pins 17.

I claim:

1. An endless track for tractors comprising a plurality of links joined to one another, each of said links comprising a tread portion, spaced upright walls extending longitudinally on the tread portion, adapted to receive a part of the next adjacent link therebetween and having pin bearing slots therein, a wall on the tread portion extending longitudinally thereof from a point between the first named walls to a point rearwardly of said first named walls whereby it may be extended between walls of the next adjacent link, a transverse pin carried by the last named wall extending laterally from each side of said wall and adapted to engage in the bearing slots of the next adjacent link and shoulders formed on opposite ends of said last named wall arranged to engage corresponding shoulders of the next adjacent link, said shoulders being inclined from the horizontal.

2. An endless track for tractors comprising a plurality of links joined to one another, each of said links comprising a tread portion, upright spaced walls extending longitudinally on the tread portion and having inclined upwardly opening pin receiving slots in the upper edges thereof, a wall extending between and outwardly from certain ends of the first named walls, a pin carried by the last named wall and projecting from opposite sides thereof for engagement in the slots of the next adjacent link and horizontally disposed shoulders formed on opposite ends of said last named wall and adapted for engagement with similar shoulders of adjacent links of the track.

ROBERT L. SAVAGE.